(12) United States Patent
Garcia et al.

(10) Patent No.: US 10,745,117 B2
(45) Date of Patent: Aug. 18, 2020

(54) RADIALLY COMPLIANT QUILL SHAFT

(71) Applicant: Sikorsky Aircraft Corporation, Stratford, CT (US)

(72) Inventors: Todd A. Garcia, Mansfield, TX (US); Bryan Kenneth Baskin, Arlington, TX (US); Huali Ding, North Richland Hills, TX (US); Biqiang Xu, Southlake, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 439 days.

(21) Appl. No.: 15/306,588

(22) PCT Filed: Apr. 22, 2015

(86) PCT No.: PCT/US2015/027046
§ 371 (c)(1),
(2) Date: Oct. 25, 2016

(87) PCT Pub. No.: WO2015/167893
PCT Pub. Date: Nov. 5, 2015

(65) Prior Publication Data
US 2017/0050727 A1 Feb. 23, 2017

Related U.S. Application Data

(60) Provisional application No. 61/985,815, filed on Apr. 29, 2014.

(51) Int. Cl.
*B64C 27/12* (2006.01)
*F16C 1/02* (2006.01)
(Continued)

(52) U.S. Cl.
CPC ............ *B64C 27/12* (2013.01); *F16C 1/02* (2013.01); *F16D 1/06* (2013.01); *F16H 55/17* (2013.01)

(58) Field of Classification Search
CPC ..................... B64C 27/12; F16D 2001/103
See application file for complete search history.

(56) References Cited

U.S. PATENT DOCUMENTS

| 3,255,825 A | 6/1966 | Mouille et al. |
| 4,611,971 A * | 9/1986 | Aubry ............ B64C 27/605 |
| | | 416/114 |

(Continued)

FOREIGN PATENT DOCUMENTS

| FR | 787869 A | 9/1935 |
| GB | 757508 A | 9/1956 |
| GB | 1252446 A | 11/1971 |

OTHER PUBLICATIONS

International Search Report and Written Opinion for Application No. PCT/US2015/027046 dated Jul. 20, 2015; 11 pgs.

(Continued)

*Primary Examiner* — Kayla Mccaffrey
*Assistant Examiner* — John S Hunter, Jr.
(74) *Attorney, Agent, or Firm* — Cantor Colburn LLP

(57) ABSTRACT

A quill shaft which translates rotational energy between a gear and a drive shaft having a drive shaft spline includes a first leg having an inner spline which meshes with the drive shaft spline and a second leg concentric with the first leg and radially offset and separated from the first leg by a gap. The second leg includes an outer spline which meshes with the gear. The first leg is connected to the second leg at one end to allow for change to a gap size during while translating the rotational energy between the gear and a drive shaft.

13 Claims, 5 Drawing Sheets

(51) Int. Cl.
*F16D 1/06* (2006.01)
*F16H 55/17* (2006.01)

(56) References Cited

U.S. PATENT DOCUMENTS

| | | |
|---|---|---|
| 5,113,713 A | 5/1992 | Isabelle et al. |
| 5,117,704 A | 6/1992 | Kish et al. |
| 5,149,013 A | 9/1992 | Costanzo et al. |
| 5,149,311 A | 9/1992 | Luijten |
| 5,807,202 A | 9/1998 | Sammataro |
| 2013/0146414 A1 | 6/2013 | Hearn et al. |

OTHER PUBLICATIONS

English Translation; French Publication No. 787869 (A); Publication Date: Sep. 30, 1935; 1 Page.
Extended European Search Report; European Application No. 15785724.4; dated Nov. 16, 2017; 8 Pages.

* cited by examiner

RADIALLY COMPLIANT QUILL SHAFT

CROSS REFERENCE TO RELATED APPLICATIONS

This application is a National Phase Application of Patent Application PCT/US2015/027046 filed on Apr. 22, 2015, which claims benefit of U.S. Provisional Application No. 61/985,815 filed Apr. 29, 2014, the contents of which are incorporated herein by reference in their entirety.

BACKGROUND

The subject matter disclosed herein relates to the art of rotary wing aircraft and, more specifically, to rotor systems for rotary wing aircraft.

In typical rotary winged aircraft, for example, helicopters, rotary power is transmitted from an engine through a gearbox into the rotor system. The gearbox includes a housing-mounted large diameter bull gear that drives a main rotor shaft which in turn drives a main rotor of the aircraft. During aircraft operations, however, flight loads on the main rotor causes misalignment and/or relative movement or deflection between the bull gear and the rotor shaft.

To accommodate the relative deflections, a complex system of parts is included to connect the bull gear to the main rotor shaft. Referring to FIG. 5, the first is an adapter 100. The adapter 100 is engaged to the main rotor shaft 102 via a spline 104 at its inner diameter and is fixed to the main rotor shaft 102 via a nut 116. Typically, due to their size and other factors such as material properties of the main rotor shaft 102, splines 104 on main rotor shafts 102 cannot be crowned, making this arrangement necessary. The adapter 100 has a second spline 106 at its outer diameter that is crowned to allow for the misalignment between the main rotor shaft 102 and the bull gear 108. The second component, a quill shaft 110 has a pair of splines separated by a considerable axial distance. One spline of the pair of splines, typically the lower spline 114, is crowned to accommodate the predicted misalignment. The upper spline 112 of the quill shaft 110 is an internal spline and mates with the adapter 100, while the lower spline 114 is an external spline and mates with the bull gear 108.

There are many disadvantages to such a system. First, the number and size of components results in a heavy assembly. Second, the height required, in particular by the quill shaft, increases assembly envelope and weight. Additionally, the assembly relies on crowned splines, which tend to exhibit wear issues in applications such as these. Finally, this system easily accommodates angular or circumferential misalignments relative to the main rotor axis, but has limited capability to accommodate radial deflection.

BRIEF DESCRIPTION

In one embodiment, a quill shaft which translates rotational energy between a gear and a drive shaft having a drive shaft spline includes a first leg having an inner spline which meshes with the drive shaft spline and a second leg concentric with the first leg and radially offset and separated from the first leg by a gap. The second leg includes an outer spline which meshes with the gear. The first leg is connected to the second leg at one end to allow for change to a gap size during while translating the rotational energy between the gear and a drive shaft.

Alternatively or additionally, in this or other embodiments, the quill shaft has a U-shaped profile, with the first leg connected to the second leg at a base of the profile.

Alternatively or additionally, in this or other embodiments the gear is a bull gear.

Alternatively or additionally, in this or other embodiments the first leg and the second leg are of unequal lengths.

Alternatively or additionally, in this or other embodiments the quill shaft is flexible in a radial direction.

In another embodiment, a rotor assembly includes a rotor shaft positioned at a central axis and rotatable thereabout. A rotor is secured to the rotor shaft. A gear is interactive with the rotor shaft to urge rotation of the rotor shaft about the central axis. A quill shaft is operably connected to the rotor shaft and the gear to transfer rotational energy between the rotor shaft and the gear. The quill shaft includes a first leg having an inner spline which meshes with the drive shaft spline and a second leg concentric with the first leg and radially offset and separated from the first leg by a gap. The second leg includes an outer spline which meshes with the gear. The first leg is connected to the second leg at one end to allow for change to a gap size during while translating the rotational energy between the gear and a drive shaft.

Alternatively or additionally, in this or other embodiments the quill shaft has a U-shaped profile, with the first leg connected to the second leg at a base of the profile.

Alternatively or additionally, in this or other embodiments a nut is secured to the rotor shaft to retain the quill shaft at the rotor shaft in an axial direction.

Alternatively or additionally, in this or other embodiments the gear is a bull gear.

Alternatively or additionally, in this or other embodiments the first leg and the second leg are of unequal lengths.

Alternatively or additionally, in this or other embodiments the quill shaft is flexible in a radial direction.

Alternatively or additionally, in this or other embodiments a bearing is supportive of the rotor shaft. The quill shaft and the gear are positioned at a same axial end of the rotor shaft, relative to the bearing.

Alternatively or additionally, in this or other embodiments the rotor includes a plurality of rotor blades secured to a rotor hub.

In yet another embodiment, a rotary wing aircraft includes an airframe, a drive positioned at the airframe and having an output gear, and a rotor assembly operably connected to the output gear. The rotor assembly includes a rotor shaft positioned at a central axis and rotatable thereabout, and a rotor secured to the rotor shaft. A quill shaft is operably connected to the rotor shaft and the output gear to transfer rotational energy between the rotor shaft and the output gear. The quill shaft includes a first leg having an inner spline that meshes with a rotor shaft spline and a second leg concentric with the first leg and radially offset and separated from the first leg by a gap. The second leg includes an outer spline that meshes with the output gear. The first leg is connected to the second leg at one end to allow for change to a gap size during while translating the rotational energy between the output gear and the rotor shaft.

Alternatively or additionally, in this or other embodiments the quill shaft has a U-shaped profile, with the first leg connected to the second leg at a base of the profile.

Alternatively or additionally, in this or other embodiments a nut is secured to the rotor shaft to retain the quill shaft at the rotor shaft in an axial direction.

Alternatively or additionally, in this or other embodiments the drive includes and engine operably connected to a gearbox, the output gear a gearbox bull gear.

Alternatively or additionally, in this or other embodiments a bearing is supportive of the drive shaft. The quill shaft and the output gear are located at a same axial end of the rotor shaft, relative to the bearing.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
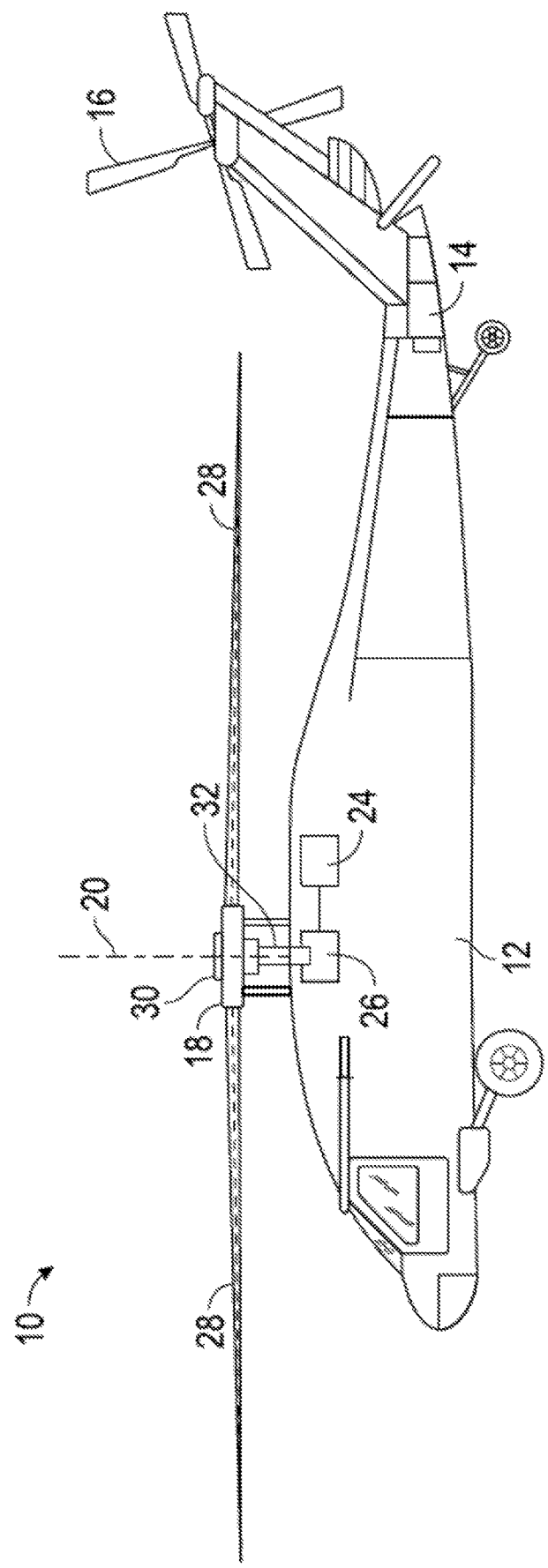
FIG. 1 is a schematic view of an embodiment of a rotary wing aircraft.

Shown in FIG. 1 is a schematic view of an embodiment of a rotary wing aircraft, in this embodiment a helicopter 10. The helicopter 10 includes an airframe 12 with an extending tail 14. A main rotor assembly 18 is located at the airframe 12 and rotates about a main rotor axis 20. The main rotor assembly 18 is driven by a power source, for example, an engine 24 via a gearbox 26 about the main rotor axis 20. The rotor assembly 18 includes a plurality of rotor blades 28 secured to a rotor hub 30, with a main rotor shaft 32 connected to the rotor hub 30 and to the gearbox 26 to transfer rotational energy from the gearbox 26 to the main rotor assembly 18. In some embodiments, the helicopter 10 further includes a tail rotor 16 located at the extending tail 14 to provide yaw control for the helicopter 10. The tail rotor 16 is connected to and driven by the engine 24 via the gearbox 26. While shown as a single rotor, it is understood that aspects of the inventions can be used in coaxial rotorcraft, tilt rotor and tilt wing aircraft, and other rotary winged aircraft.

Figure 2:
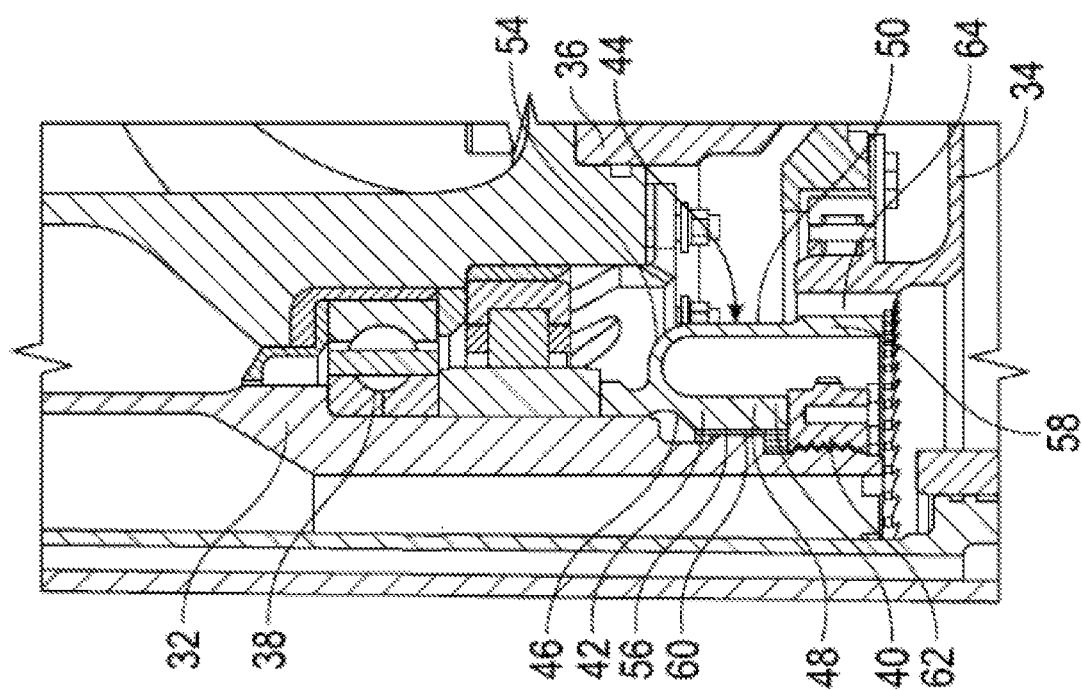
FIG. 2 is a cross-sectional of an embodiment of a rotor drive assembly for a rotary wing aircraft.
Figure 2:
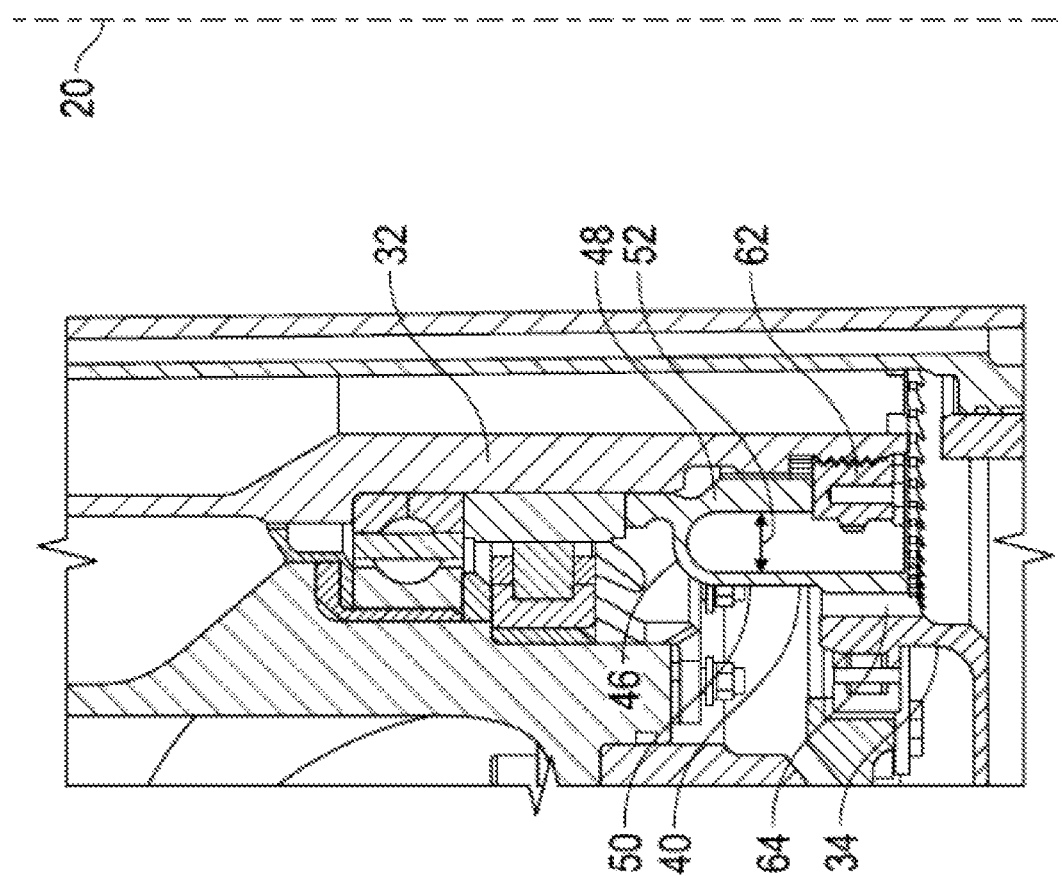
Figure 3:
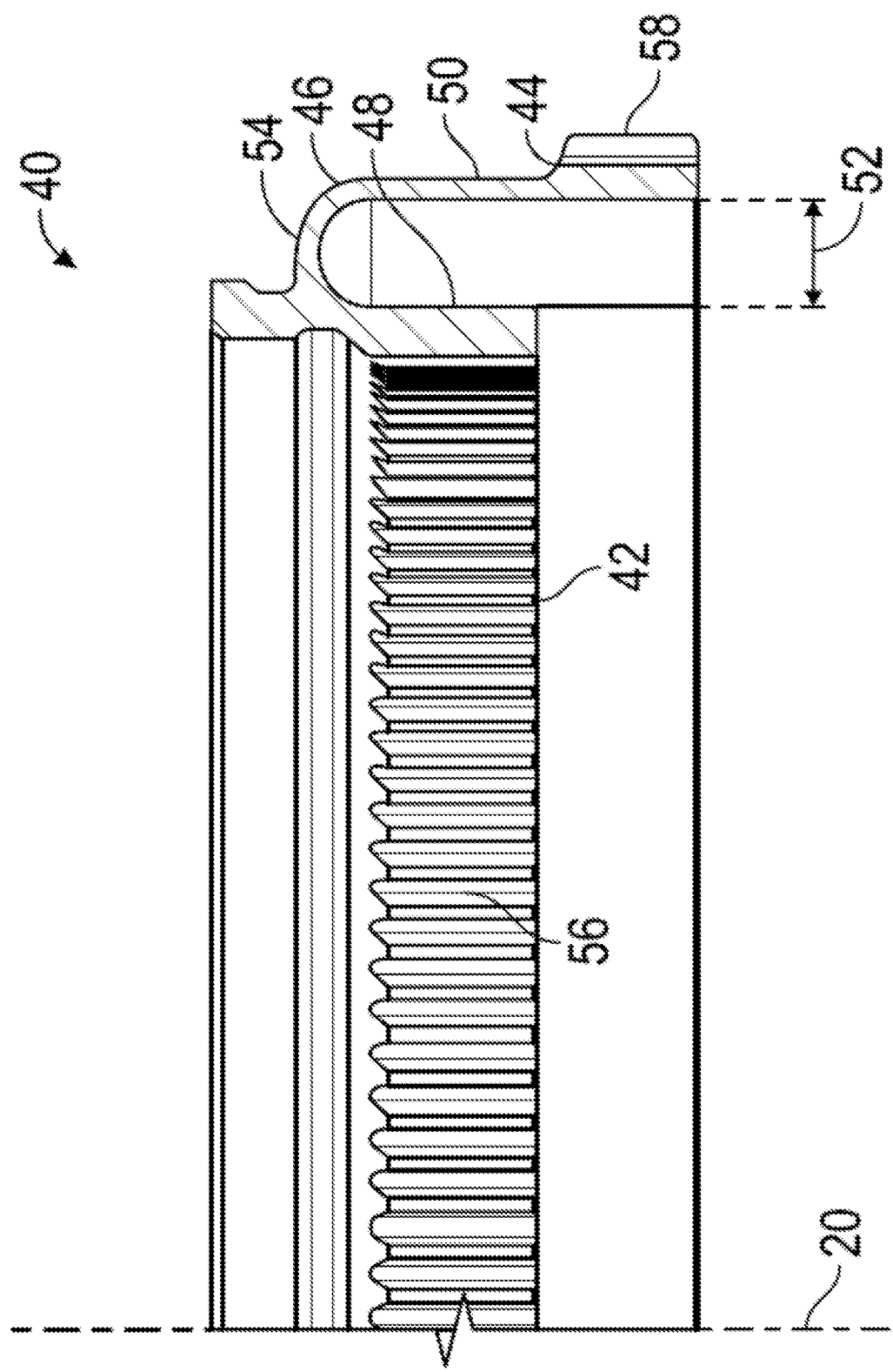
FIG. 3 is a cross-sectional view of an embodiment of a quill shaft.
Figure 4:
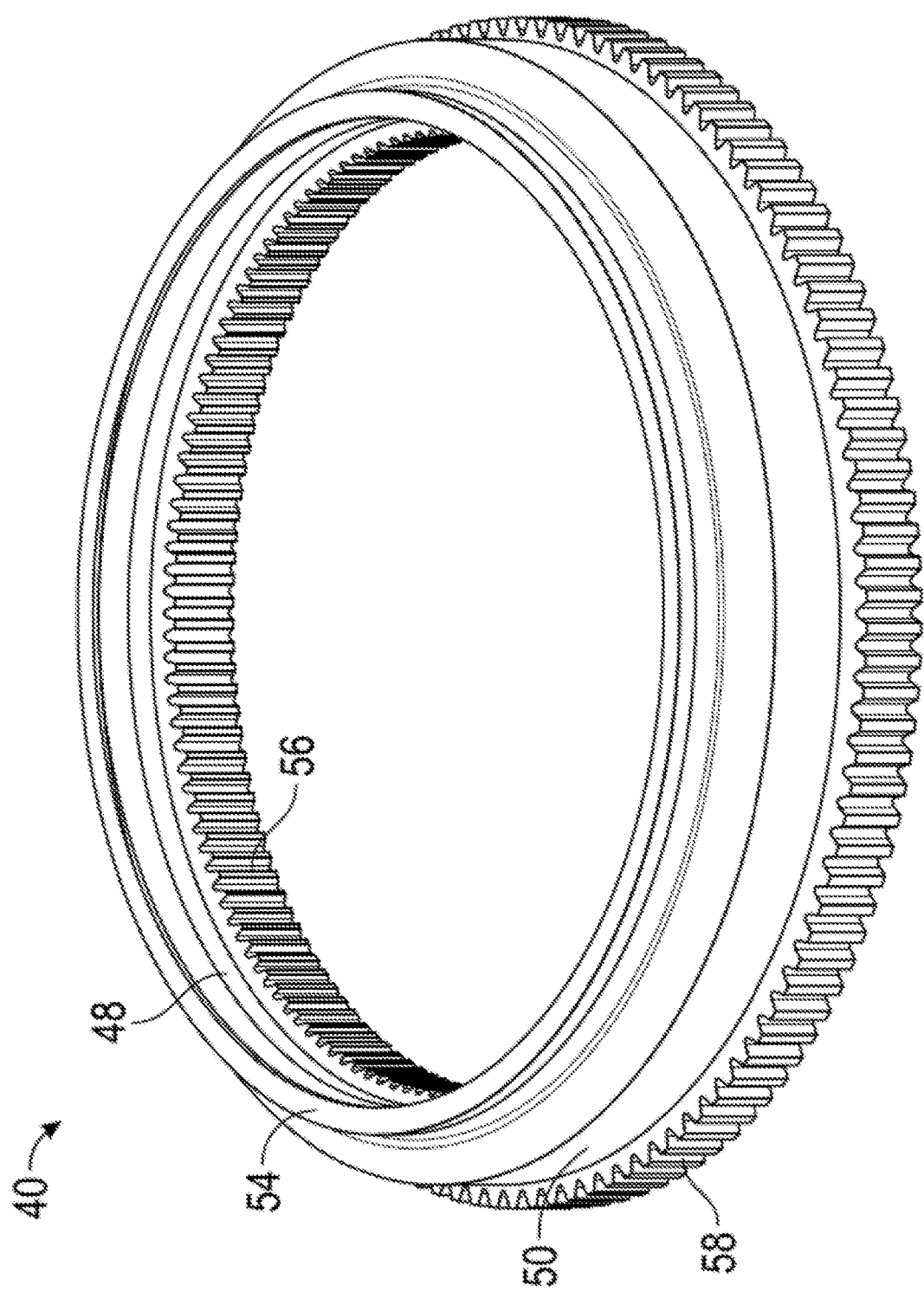
FIG. 4 is a perspective view of an embodiment of a quill shaft.
Figure 5:
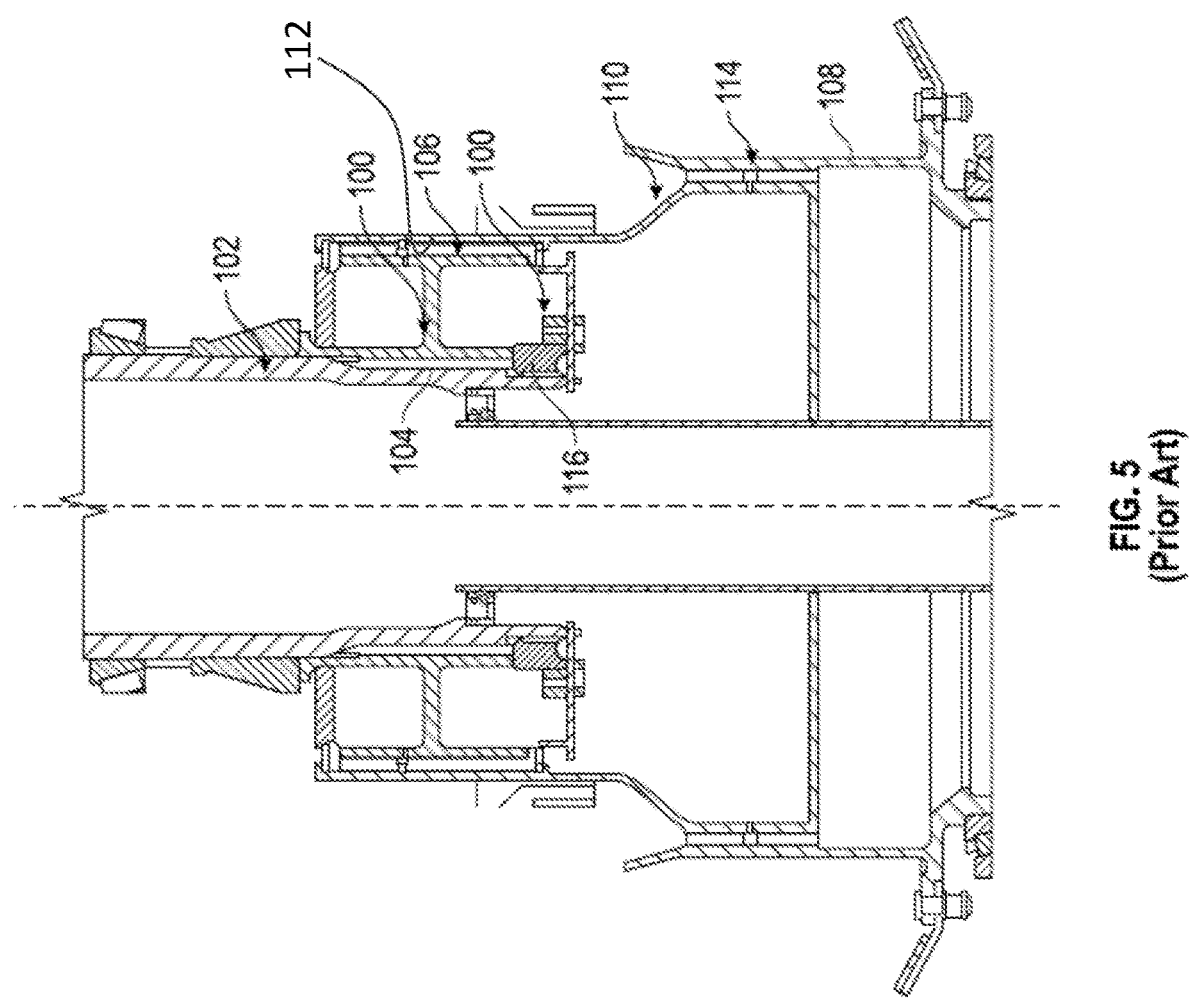
FIG. 5 is a cross-sectional view of a prior art shaft drive for a main rotor of a rotary wing aircraft.

Referring to FIG. 2, the gearbox 26 includes a bull gear 34 operably connected to the engine 24 through one or more gear reduction stages (not shown) or the like. While the gearbox 26 is depicted including a bull gear 34, one skilled in the art will appreciate that the gearbox may include other drives. The bull gear 34 is positioned in a gearbox housing 36. The main rotor shaft 32 is supported at the gearbox housing 36 by a main rotor bearing 38, and is rotationally connected to the bull gear 34 by a quill shaft 40, shown in more detail in FIGS. 3 and 4. The quill shaft 40 is a ring having an inner diameter 42 and an outer diameter 44. An inner spline 56 is located at the inner diameter 42, while an outer spline 58 is located at the outer diameter 44. The quill shaft 40 has an inverted U-shaped cross-sectional profile 46 such that the inner diameter 42 resides on a first leg 48 and the outer diameter 44 resides on a second leg 50 separated from the first leg 48 by a distance 52. The first leg 48 and the second leg 50 are connected by a peak portion 54 of the quill shaft 40. In some embodiments, the first leg 48 is shorter than the second leg 50. The U-shaped profile 46 results in a quill shaft 40 that has radial compliance or flexibility, such that when necessary due to flight loads and/or manufacturing tolerance mismatch the distance 52 between the first leg 48 and the second leg 50 changes with loads applied thereto. Further, to aid in the compliance, while reducing the possibility of fatigue failure or fracture of the quill shaft 40, the quill shaft 40 is formed from a relatively low stiffness, high fatigue strength material such as titanium, which also contributes to weight reduction. As shown, the quill shaft 40 is a single, integral piece formed by machining or casting from a common material such that the first and second legs 48, 50 extend from the peak portion 54.

Referring again to FIG. 2, the quill shaft 40 is piloted and connected to the main rotor shaft 32 via connection between the inner spline 56 and a complimentary main rotor spline 60. The quill shaft 40 is secured in place axially via a shaft nut 62 installed on the main rotor shaft 32 to retain the quill shaft 40 axially between the shaft nut 62 and the main rotor bearing 38. The outer spline 58 meshes with a bull gear drive spline 64 of the bull gear 34, such that rotation of the bull gear 34 about the main rotor axis 20 drives rotation of the quill shaft 40/main rotor shaft 32 assembly about the main rotor axis 20.

The quill shaft 40 is configured with the inverted U-shaped profile 46 such that it is flexible enough to accommodate anticipated deflection, both angular and radial displacements, occurring during normal operations, without exceeding stress limits. Further, the disclosed configuration reduces a number of components, both simplifying and reducing weight and envelope, especially height, of the assembly. It is to be appreciated that while the assembly is described herein in the context of a drive system for a rotorcraft, one skilled in the art will readily appreciate that such a quill shaft 40 may be utilized in other rotary shaft drive systems in order to accommodate deflections and misalignments due to operational conditions and/or a stackup of manufacturing tolerances. Such other applications include, but are not limited to, wind turbines, marine applications, industrial applications or the like.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For instance, aspects can be used with propeller assemblies, wind turbines, turbines, fans or anywhere there is a cantilever connection between a gear and a shaft. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A quill shaft which translates rotational energy between a gear and a drive shaft having a drive shaft spline, the quill shaft comprising:
   a first leg having an inner spline configured to mesh with the drive shaft spline; and
   a second leg concentric with the first leg and radially offset and separated from the first leg by a distance, the second leg including an outer spline configured to mesh with the gear, at least one of the first leg and the second leg being oriented parallel to an axis of the drive shaft, wherein the first leg is connected to the second leg at one end to allow the distance to change while transmitting rotational energy between the gear and the drive shaft;

wherein the quill shaft has a U-shaped cross-sectional profile such that a first end of the first leg is connected to a first end of the second leg via an arcuate peak portion, the quill shaft being flexible in the radial direction when necessary due to flight loads and/or manufacturing tolerance mismatch.

2. The quill shaft of claim 1, wherein the gear is a bull gear.

3. The quill shaft of claim 1, wherein the first leg and the second leg are of unequal lengths.

4. A rotor assembly comprising:
a rotor shaft disposed at a central axis and rotatable thereabout;
a rotor secured to the rotor shaft;
a gear interactive with the rotor shaft to urge rotation of the rotor shaft about the central axis; and
a quill shaft operably connected to the rotor shaft and the gear to transfer rotational energy between the rotor shaft and the gear, the quill shaft including:
a first leg having an inner spline which meshes with the drive shaft spline; and
a second leg concentric with the first leg and radially offset and separated from the first leg by a distance, the second leg including an outer spline configured to mesh with the gear, at least one of the first leg and the second leg being oriented parallel to an axis of the drive shaft, wherein the first leg is connected to the second leg at one end to allow the distance to change while transmitting rotational energy between the gear and the drive shaft;
wherein the quill shaft has a U-shaped cross-sectional profile such that a first end of the first leg is connected to a first end of the second leg via an arcuate peak portion, the quill shaft being flexible in the radial direction when necessary due to flight loads and/or manufacturing tolerance mismatch.

5. The rotor assembly of claim 4, further comprising a nut secured to the rotor shaft to retain the quill shaft at the rotor shaft in an axial direction.

6. The rotor assembly of claim 4, wherein the gear is a bull gear.

7. The rotor assembly of claim 4, wherein the first leg and the second leg are of unequal lengths.

8. The rotor assembly of claim 4, further comprising a bearing supportive of the rotor shaft, the quill shaft and the gear disposed at a same axial end of the rotor shaft, relative to the bearing.

9. The rotor assembly of claim 4, wherein the rotor includes a plurality of rotor blades secured to a rotor hub.

10. A rotary wing aircraft comprising:
an airframe;
a drive disposed at the airframe and having an output gear; and
a rotor assembly operably connected to the output gear including:
a rotor shaft disposed at a central axis and rotatable thereabout;
a rotor secured to the rotor shaft; and
a quill shaft operably connected to the rotor shaft and the output gear to transfer rotational energy between the rotor shaft and the output gear, the quill shaft including:
a first leg having an inner spline that meshes with a rotor shaft spline; and
a second leg concentric with the first leg and radially offset and separated from the first leg by a distance, the second leg including an outer spline configured to mesh with the gear, at least one of the first leg and the second leg being oriented parallel to an axis of the drive shaft, wherein the first leg is connected to the second leg at one end to allow the distance to change while transmitting rotational energy between the gear and the drive shaft;
wherein the quill shaft has a U-shaped cross-sectional profile such that a first end of the first leg is connected to a first end of the second leg via an arcuate peak portion, the quill shaft being flexible in the radial direction when necessary due to flight loads and/or manufacturing tolerance mismatch.

11. The rotary wing aircraft of claim 10, further comprising a nut secured to the rotor shaft to retain the quill shaft at the rotor shaft in an axial direction.

12. The rotary wing aircraft of claim 10, wherein the drive includes an engine operably connected to a gearbox, and the output gear is a gearbox bull gear.

13. The rotary wing aircraft of claim 10, further comprising a bearing supportive of the drive shaft, the quill shaft and the output gear disposed at a same axial end of the rotor shaft, relative to the bearing.

* * * * *